Nov. 9, 1943.　　　G. T. RONK　　　2,334,037
TRANSPORT TRAILER
Filed June 19, 1940　　　2 Sheets-Sheet 1
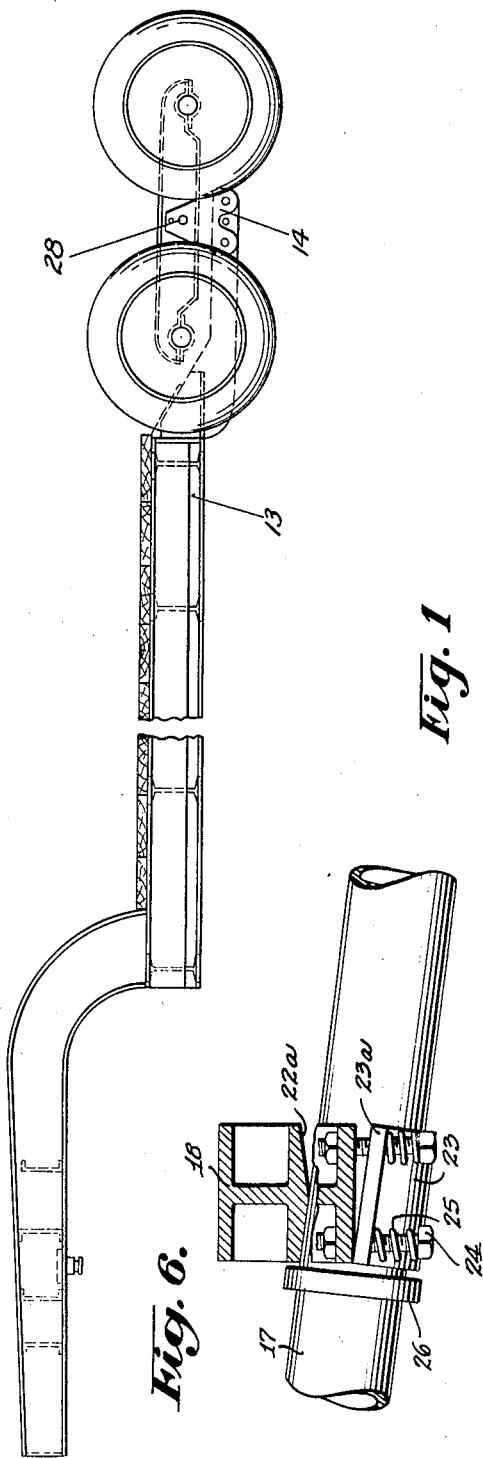
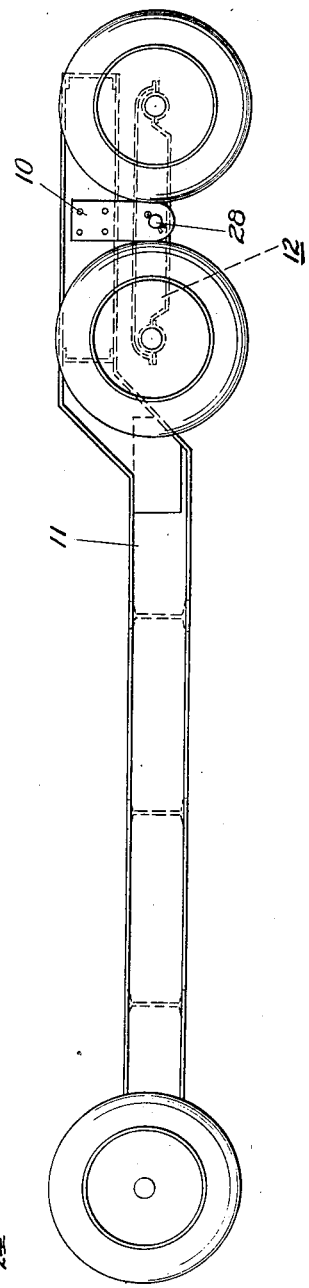
INVENTOR.
GEORGE T. RONK
BY Flournoy Corey,
ATTORNEY.

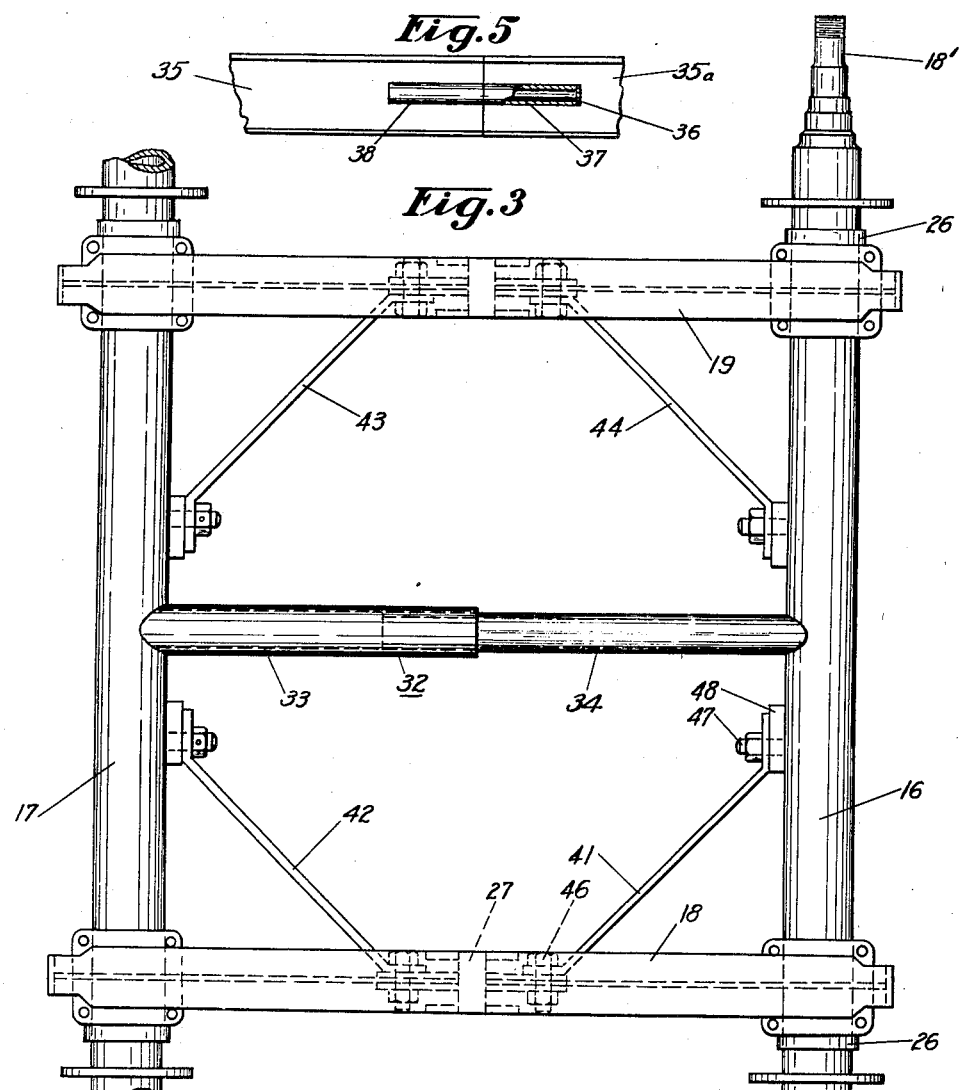

Patented Nov. 9, 1943

2,334,037

UNITED STATES PATENT OFFICE 2,334,037

TRANSPORT TRAILER

George T. Ronk, Cedar Rapids, Iowa

Application June 19, 1940, Serial No. 341,269

5 Claims. (Cl. 280—111)

This invention relates to tandem axles and their connecting and controlling members, particularly adaptable for use with low platform trailers, as shown in my co-pending application, Serial Number 341,268, filed June 19, 1940.

It is the object of this invention to provide a tandem axle gear or truck which will permit the transport of excessive loads over rough country by equalizing the load fairly among the wheels, while permitting the various wheels to follow each its own necessary track on various planes of contact.

It is a further object of my invention to provide a suitable tandem axle truck which will permit the free and independent raising and lowering of the wheels while bearing excessive loads over uneven ground, without distortion of the gear or wrecking of the traction equipment.

It is a further purpose to provide torque control of the axles during braking operations, while allowing the full operation and free movement of the axles within the equalizer members of the truck.

It is a further object to provide a flexible means for bracing the axle gear against distortion of the essential rectangular arrangement of the gear, during movement under heavy load.

It is a further object to balance the torque of one axle against that of the other for lightness of weight and low cost.

A still further object of the invention is the provision of a relatively simple structure of this character such as may be manufactured at comparatively low cost.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in elevation showing how a tandem axle, constructed according to my invention, may be attached to an otherwise conventional trailer structure. In this embodiment of the invention the tandem axle structure is below the frame of the trailer.

Figure 2 is a view in elevation illustrating how a tandem axle, constructed according to my invention, may be applied to an underhung frame.

Figure 3 is a plan view of the tandem axle structure shown in Figures 1 and 2 with portions thereof broken away to illustrate the structure in greater detail.

Figure 4 is a view, partly in side elevation and partly in section, illustrating one of the equalizer bars and the means by which this equalizer bar engages the tandem axles.

Figure 5 is a fragmentary view in elevation, partly in section, of a modified form of torque beam, and Figure 6 is a fragmentary view, partly in section, showing an axle bearing member when distorted.

Referring now to the drawings:

A wheel truck or tandem axle structure built in accordance with my invention may be applied to any of the conventional trailer frames, and in Figure 1 I have illustrated this as applied to such a frame. In this structure, any suitable form of depending support 10 is secured to the trailer frame 11 in the usual manner and to the tandem axle, indicated generally at 12. This may be a firmly mounted structure for heavy loads, such as shown in the drawing, or it may be of the conventional spring suspension type ordinarily used in merchandise trailers and the like.

In Figure 2 I have illustrated how this tandem axle structure 12 may be applied to an underslung trailer frame 13 such as those used for hauling extremely heavy machinery and the like and such as are illustrated in my copending application Serial Number 341,268, filed June 19, 1940.

Referring now more particularly to Figures 3, 4, 5 and 6, a preferred form of my invention includes the tubular axles 16 and 17. These are of more or less usual form and construction, and the axle is preferably hollow for lightness and terminates in axle stubs or spindles 18' on which dual or single wheels may be rotatably mounted in accordance with the usual custom.

It is obvious that if a rigid frame were employed for mounting axles of this character, the wheels could not adapt themselves to any inequalities of road surface. For instance, if one wheel was high, the other wheel on the same side of the truck might be raised off the ground, and this is particularly true if there is a racking of the wheels—that is, if wheels on opposite corners of the frame are raised at the same time. Obviously this condition would soon result in destruction of the frame, and it is to meet these conditions of road surface for which my invention is intended. The desired results are accomplished by means of the structure I am about to describe.

The axles 16 and 17 are connected near their outer ends by equalizer or rocking beam members 18 and 19. The axles 16 and 17 are received in semi-cylindrical or cupped recesses 21 and 22 on the forward and rear ends of these equalizer bars. Caps 23 are provided for holding the axles in place within the recesses. Of course under ordinary conditions the weight of the load holds the axles in place in the recesses, but the caps are provided in order to take care of unusual conditions where there is a tendency to separation of the axle and the equalizer bars.

It is to be noted that the caps 23 are secured in place against the axles by means of bolts 24 and coil springs 25 bearing between the heads of the bolts and the flanges 23a of the caps. The cupped recesses 21 and 22 on the equalizers are elongated vertically at their outer ends, as shown at 21a and 22a, in Figures 4 and 6, to permit the equalizer to tip relative to the axle and still retain a substantial bearing surface. This structure permits tilting of the axles in the recesses, as for instance, when one or the other wheel on a given axle is raised higher than the rest of the wheels.

Spacing rings 26 on the axles outside of the equalizers prevent the equalizers from moving longitudinally of the axles. Each equalizer bar is provided with a bearing surface 27 near its midpoint and the tandem truck structure is pivotally mounted by stub shafts 28 received in these openings (Figures 1 and 2). The stub shafts 28 are in turn secured to the support members 10 or 14 on the trailer frames.

It is apparent that differential rocking movement of the axles produces, not only tilting of the axles in the equalizer or rocking beam members, but that there is also a tendency to rotate one axle with respect to the other about a transverse axis through the two axles, but inasmuch as the tubular axles would tend to rotate on the application of brakes, it is necessary to provide some means for preventing that rotation.

I preferably prevent rotation of the axles by means of the torque tube illustrated generally at 32. This torque tube consists of two parts, a front tubular portion 33 which is welded or otherwise attached to the front axle 17, and a rear tubular portion 34 which is welded or otherwise secured to the rear axle 16.

One tubular member 34 is of suitable size to be received for free sliding and rotating movement in its companion tubular member to permit the axles to rotate with respect to one another on the longitudinal axis of the torque beam, to thus permit the axles to tilt with respect to one another, but to prevent them from turning on their own axes.

Any other suitable form of torque member may be employed, and I have shown a modified structure in Figure 5 consisting of an I section beam in two parts 35 and 35a provided with tubular members 37 and 38 embedded in axial alignment in the adjacent ends of the beams. These tubes receive the shaft 36 and afford a bearing for the shaft to permit rotation of the portions of the torque beam with respect to one another and about the axis of the beam.

It is desirable that means be provided for maintaining the rectangular relation of the assembly. In use, the axles are subjected to various forces tending to distort the assembly to a rhomboid, and I therefore provide the corner braces 41, 42, 43 and 44 for meeting these twisting forces. These brackets are engaged to the equalizer bars or rocking beams by means such as the bolts 46 which permit limited pivotal movement of these ends of the corner braces as the equalizers move up and down at their ends. The opposite ends of the corner braces are attached to the axles by means of studs 47 embedded in metal blocks 48 welded or otherwise attached to the axles, and these ends of the corner brackets also may pivot on the studs 47 to permit tilting of the axles. These corner bracing members will prevent the distortion of the assembly without limiting, to any great extent, the essential relative movement of the wheels when passing over uneven ground.

It is apparent that the rocking beams may rotate or rock on the pivot mounting means afforded by the stub shafts 28 and, furthermore, that the axles may tilt with respect to the equalizers through the flexible mounting of the caps 23 of the equalizer bearings. Furthermore the axles themselves may rotate in substantially vertical parallel planes with respect to one another while the axles themselves are prevented from rotating on their own axes, when brakes are applied, by reason of the torque beam. By means of my invention, the wheels are permitted the essential movements of rotation, and up and down differential movement with respect to one another which occurs in going over rough ground, through oscillation of the equalizer bars, but undesirable forces such as those tending to distort the frame and those tending to rotate the axles in their bearings, are restrained and controlled. By reason of the resilient mounting of the axles and the equalizer bearings, distortion of the equalizer members is avoided.

Although I have described specific embodiments of my invention, it is apparent that modifications may be made by those skilled in the art. Such modifications may be made without departing from the spirit and scope of my invention as set forth in the appended claims.

I claim as my invention:

1. In a tamdem axle structure, a pair of substantially parallel axles, a pair of parallel equalizers of I beam section, load bearing stub shafts attached to the equalizers at the centers thereof for pivotally supporting a load, an upper bearing member affixed to the under surface of each equalizer at a spaced distance from the center thereof, a lower bearing member for each upper bearing member, means comprising bolts and springs for biasing the lower bearing members toward the upper bearing members, the upper bearing members having diameters larger vertically at the ends thereof than at the centers to permit limited rolling of the axles in vertical planes within the upper bearing members, collars affixed to the axles adjacent the outer end of each bearing for preventing any substantial movement in a lateral direction of the axles relative to the equalizers, a torque tube comprising a pair of tubes, one slidable within the other, one end of each of said tubes being permanently affixed to one of said axles at the middle thereof and at right angles thereto, and means comprising strap-like members and pivot pins for connecting each equalizer to each axle at substantially equal distances from the connecting bearing members.

2. In a tandem rear axle structure, a frame comprising a pair of parallel axles, a pair of parallel equalizers joining the axles at right angles and spacing them equally apart, rotatable bearings having upper and lower sections for mounting the equalizers on the axles, the upper section being flared from the center outwardly along the transverse axis thereof, the lower section fitting the axle snugly, and resilient means for joining the parts of the split bearings to permit the elongation of the bearing vertically when the frame is distorted by unequal elevation of the wheels of the said axle gear.

3. In combination, substantially parallel tandem axles mounted on wheels, a pair of equalizers spacing said axles apart substantially at right angles thereto, said equalizers being adapted to support a load at their respective centers, rotatable and resilient bearings having upper and lower sections connecting said axles and said equalizers, the upper section of said bearings being flared from the center outwardly along the transverse axis thereof, the lower section fitting snugly and spring mounted means to permit the limited separation of the parts of said bearings, when one of said axles rotates out of the same horizontal plane occupied by the other said axle due to uneven roadway.

4. In an equalizer for tandem axles, a pair of axles, an I beam section adapted for supporting a load pivotally and centrally thereof, a flared semi-cylindrical bearing mounted in each end thereof on the horizontal plane of said load pivot for rotatable engagement on the said axles, and a semi-cylindrical bearing cap resiliently attached below each of said bearing surfaces for holding said equalizer snugly in place on said axle, and for allowing the said bearing cap and first named bearing to separate vertically to a limited extent to permit the free action of said axles without distortion of said beam section when used on uneven ground.

5. In combination, a pair of parallel tandem axles mounted on wheels, a pair of parallel equalizers with an I-beam section adapted by means of a stub shaft at its center to support a load pivotally and centrally thereof, a flared, semi-cylindrical bearing mounted in each end on the horizontal plane of said load pivot, for rocking and rotatable engagement on said axles, a semi-cylindrical bearing cap snugly and resiliently attached below each of said bearings, and a two-part, tubular torque control member to control the braking torque of said axles, said torque member comprising a tube of different size welded to each axle and connected by a telescopic joint to allow each of said axles to rotate on the axis of said torque control member, independent of the other said axle.

GEORGE T. RONK.